(12) United States Patent
Ran et al.

(10) Patent No.: US 10,410,196 B1
(45) Date of Patent: Sep. 10, 2019

(54) SYSTEM AND METHOD TO ENABLE PAYMENT USING MARK GENERATION AND MOBILE DEVICE

(71) Applicants: Alexander Ran, Palo Alto, CA (US); Cynthia J. Osmon, Mountain View, CA (US); William T. Laaser, Palo Alto, CA (US); Komal Bhatia, Mountain View, CA (US); Mithun Mahadevan, Mountain View, CA (US)

(72) Inventors: Alexander Ran, Palo Alto, CA (US); Cynthia J. Osmon, Mountain View, CA (US); William T. Laaser, Palo Alto, CA (US); Komal Bhatia, Mountain View, CA (US); Mithun Mahadevan, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 810 days.

(21) Appl. No.: 14/093,296

(22) Filed: Nov. 29, 2013

(51) Int. Cl.
*G06Q 20/20* (2012.01)

(52) U.S. Cl.
CPC .................................. *G06Q 20/202* (2013.01)

(58) Field of Classification Search
CPC ......... H04W 84/12; H04W 4/80; H04W 4/18; H04W 12/06; G06Q 20/3278; G06Q 20/20; G06Q 20/202; G06Q 20/32; G06Q 20/40
USPC ............................................. 705/21; 235/375
See application file for complete search history.

(56) References Cited

U.S. PATENT DOCUMENTS

| | | | |
|---|---|---|---|
| 8,504,428 B1 * | 8/2013 | Houghtaling | G06Q 20/12 705/16 |
| 8,625,796 B1 * | 1/2014 | Ben Ayed | H04L 63/0853 380/258 |
| 8,646,060 B1 * | 2/2014 | Ben Ayed | H04L 63/0853 726/9 |
| 8,806,567 B1 * | 8/2014 | Venable, Sr. | H04L 63/0823 340/8.1 |
| 8,857,713 B2 * | 10/2014 | Lieberman | G06Q 40/123 235/380 |
| 9,208,492 B2 * | 12/2015 | Hoyos | H04L 63/0861 |
| 2010/0012715 A1 * | 1/2010 | Williams | G06Q 20/32 235/375 |

(Continued)

FOREIGN PATENT DOCUMENTS

WO   WO 2014032170 A1 *  3/2014 ............. G06Q 20/20

*Primary Examiner* — Florian M Zeender
*Assistant Examiner* — Milena Racic
(74) *Attorney, Agent, or Firm* — Ferguson Braswell Fraser Kubasta PC

(57) ABSTRACT

A non-transitory computer readable medium including instructions that, when executed by a processor, perform a method involving: receiving, by a point of sale (POS) system, purchase data for a customer; generating bidirectional connection data for the customer, where the bidirectional connection data describes a bidirectional connection; encoding a symbol with the purchase data and the bidirectional connection data; presenting the symbol to the customer; enabling the bidirectional connection in response to a connection request from the customer; receiving payment data from the customer over the bidirectional connection; comparing the payment data to the purchase data; and sending a payment confirmation to the customer over the bidirectional connection in response to a determination that the payment data satisfies the purchase data.

20 Claims, 13 Drawing Sheets

(56) References Cited

U.S. PATENT DOCUMENTS

| | | | |
|---|---|---|---|
| 2010/0128634 A1* | 5/2010 | Rhee | H04W 40/246 370/254 |
| 2011/0081860 A1* | 4/2011 | Brown | H04N 1/00347 455/41.3 |
| 2012/0124365 A1* | 5/2012 | Black | G07F 7/00 713/150 |
| 2012/0253913 A1* | 10/2012 | Richard | G06Q 20/322 705/14.27 |
| 2012/0317628 A1* | 12/2012 | Yeager | G06Q 20/204 726/5 |
| 2013/0097080 A1* | 4/2013 | Smets | G06T 1/20 705/44 |
| 2013/0110607 A1* | 5/2013 | Basmajian | G06Q 30/0234 705/14.26 |
| 2013/0134212 A1* | 5/2013 | Chang | G06F 11/0742 235/375 |
| 2013/0171929 A1* | 7/2013 | Adams | H04W 4/80 455/41.1 |
| 2013/0194478 A1* | 8/2013 | Kawasaki | H04M 1/72555 348/333.01 |
| 2013/0262314 A1* | 10/2013 | Butler | G06Q 30/04 705/50 |
| 2013/0268437 A1* | 10/2013 | Desai | G06Q 20/08 705/41 |
| 2014/0108260 A1* | 4/2014 | Poole | G06Q 20/3226 705/64 |
| 2014/0129428 A1* | 5/2014 | Tyler | G06Q 20/3226 705/39 |
| 2014/0231509 A1* | 8/2014 | Luoma | G06Q 30/0207 235/380 |
| 2014/0289107 A1* | 9/2014 | Moshal | G06F 17/30879 705/40 |
| 2015/0089613 A1* | 3/2015 | Tippett | H04L 63/0853 726/7 |
| 2015/0127840 A1* | 5/2015 | Snodgrass | G06F 17/30861 709/228 |
| 2016/0307194 A1* | 10/2016 | Bhatnagar | G06Q 20/38215 |

* cited by examiner

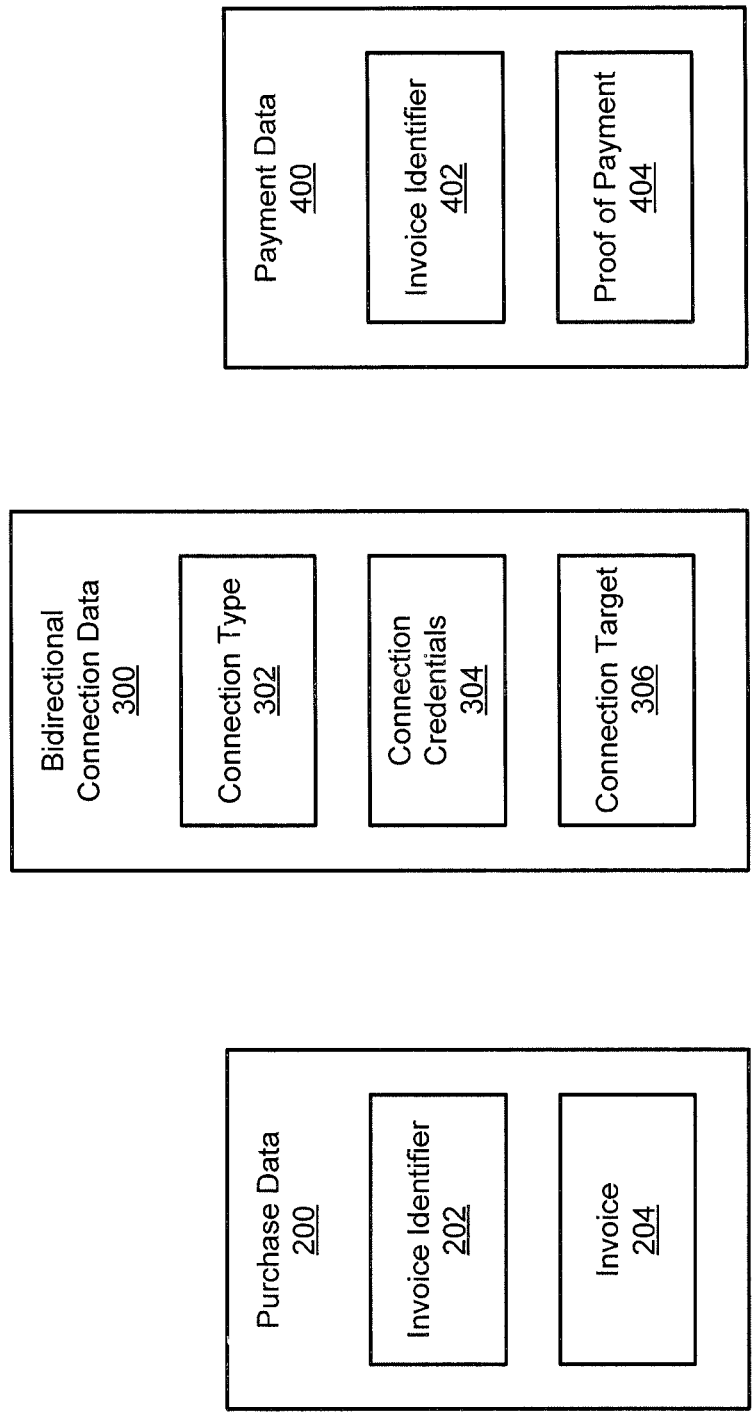

SYSTEM AND METHOD TO ENABLE PAYMENT USING MARK GENERATION AND MOBILE DEVICE

BACKGROUND

Point of sale systems have typically required the use of specialized and expensive equipment. Further, each new form of payment would often require the purchase of updated equipment. Recently, traditional equipment necessary for a point of sale system has become inexpensive and widely available. However, new forms of payment are becoming increasingly common, making it difficult for a small merchant to purchase the specialized equipment necessary for these new types of payment.

SUMMARY

In general, one or more aspects of the invention relate generally to a non-transitory computer readable medium comprising instructions that, when executed by a processor, perform a method. The method comprises receiving, by a point of sale (POS) system, purchase data for a customer; generating bidirectional connection data for the customer, wherein the bidirectional connection data describes a bidirectional connection; encoding a symbol with the purchase data and the bidirectional connection data; presenting, on the POS system, the symbol to the customer; enabling the bidirectional connection in response to a connection request from the customer; receiving payment data from the customer over the bidirectional connection; comparing the payment data to the purchase data; and sending a payment confirmation to the customer over the bidirectional connection in response to a determination that the payment data satisfies the purchase data.

In general, one or more aspects of the invention relate generally to a method comprising: scanning a symbol presented on a point of sale (POS) system comprising a POS processor; decoding the symbol to obtain purchase data and bidirectional connection data, wherein the bidirectional connection data describes a bidirectional connection; generating payment data using the purchase data; establishing the bidirectional connection with the POS system; sending the payment data to the POS system over the bidirectional connection; and receiving payment confirmation from the POS system over the bidirectional connection in response to the sending the payment data.

In general, one or more aspects of the invention relate generally to a system comprising a point of sale (POS) system. The POS system comprising: a POS processor; a display; and a POS application. The POS application, executing on the POS processor is configured to receive purchase data for a customer; generate bidirectional connection data for the customer, wherein the bidirectional connection data describes a bidirectional connection; encode a symbol with the purchase data and the bidirectional connection data; present, on the display, the symbol to the customer; enable the bidirectional connection in response to a connection request from the customer; receive payment data from the customer over the bidirectional connection; compare the payment data to the purchase data; and send a payment confirmation to the customer over the bidirectional connection in response to a determination that the payment data satisfies the purchase data.

Other aspects of the invention will be apparent from the following description and the appended claims.

BRIEF DESCRIPTION OF DRAWINGS

FIGS. 1, 2, 3, and 4 show systems in accordance with one or more embodiments of the invention.

DETAILED DESCRIPTION

Figure 1:
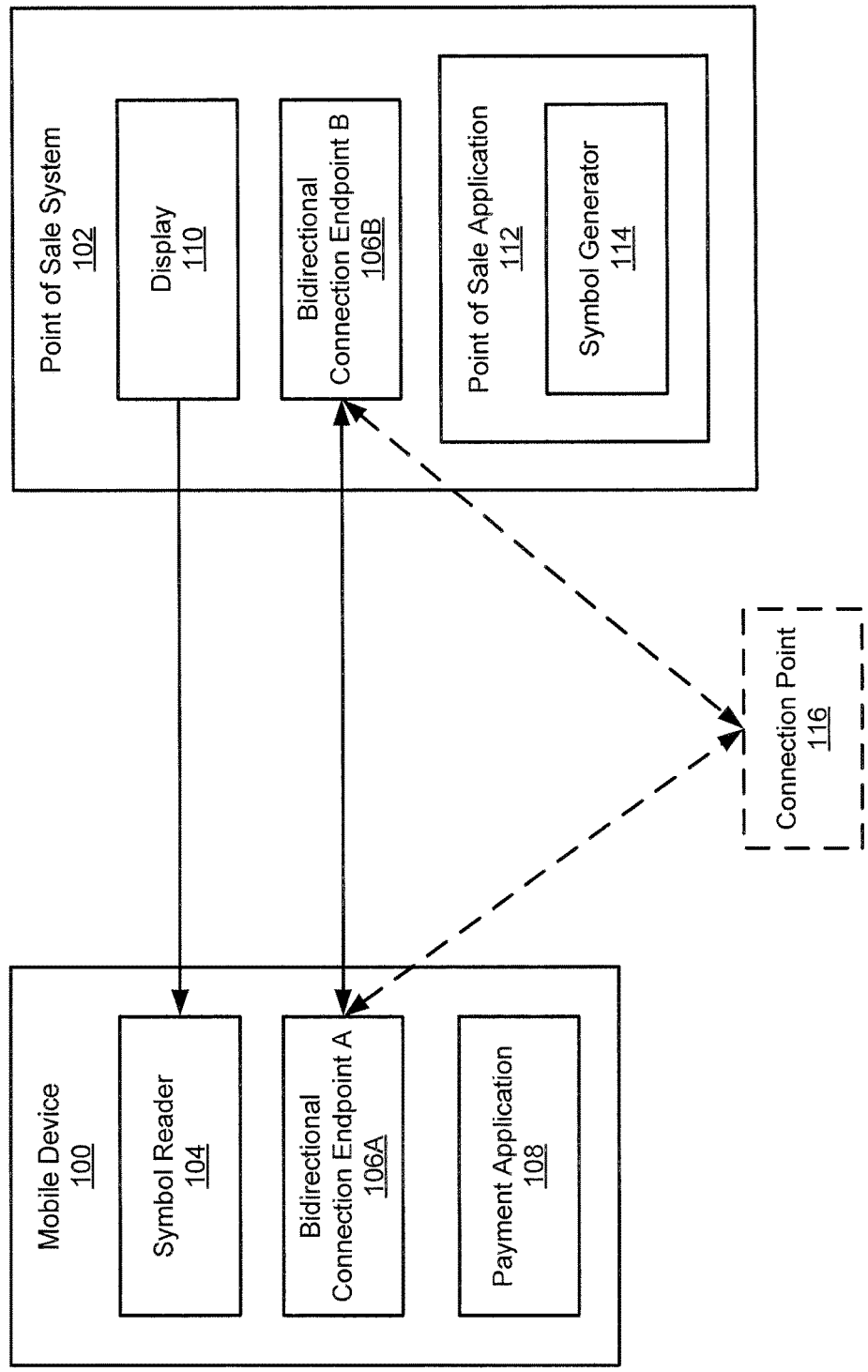

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for using data encoded in a symbol to establish a bidirectional connection and complete a business transaction. Specifically, embodiments of the invention may be used in a point of sale (POS) system to encode purchase data and connection data into a symbol that can be scanned and decoded by a mobile device. The user of the mobile device may then establish a connection to the POS system using the connection data and send proof of payment to the POS system over the connection. Embodiments of the invention may be used by merchants to securely accept emerging forms of payment without the need to invest in expensive new equipment.

For example, a merchant's POS system may display a two dimensional barcode (such as a quick response (QR) code) on the display attached to the POS system. A customer may then use an application on the customer's mobile device that reads the QR code and uses information embedded in the QR code to establish a wireless networking connection directly with the POS application on the POS system. Information embedded in the QR code may include information for establishing the connection (such as network credentials) and information on the purchase (such as amount due and items purchased). Using the connection, the merchant's POS system and the customer's mobile device exchange information used to complete the payment.

FIG. 1 shows a diagram of a system in accordance with one or more embodiments of the invention. As shown in FIG. 1, the system includes a mobile device (100) and a POS system (102). The mobile device (100) includes a symbol reader (104), bidirectional connection endpoint A (106A), and a payment application (108). The POS system (102) includes a display (110), bidirectional connection endpoint B (106B), and a POS application (112). The POS application (112) includes a symbol generator (114). Bidirectional connection endpoint A (106A) and bidirectional connection endpoint B (106B) may optionally connect to a connection point (116).

In one or more embodiments of the invention, the mobile device (100) is a combination of computer hardware and software capable of communicating with the POS system (102). Specifically, the mobile device (100) is a device operated by a buyer or customer who is attempting to transmit payment to the merchant or seller operating the POS system. Examples of mobile devices (100) include, but are not limited to, smartphones, tablet computers, laptop computers, and wearable computers.

In one or more embodiments of the invention, the POS system (102) is a computer system or group of computer systems with functionality to process purchases. Specifically, the POS system (102) is a device operated by a merchant or seller attempting to receive payment for goods and services rendered to the customer or buyer. The POS system (102) may further include functionality to scan product codes for the identification of items and perform other functions related to the sale of goods. In one or more embodiments of the invention, at least a portion of the components of the POS system (102) may be hardware attachments that interface with the POS application (112). In one or more embodiments of the invention, the POS system (102) is implemented as a tablet computer. The POS system (102) may also be implemented, for example, as a smartphone, laptop computer, or desktop computer.

In one or more embodiments of the invention, the POS application (112) is software executing on the POS system (102) with functionality to generate purchase data and process payment data. Specifically, the POS application (112) may include functionality to create records of transactions between a merchant or seller and customers or buyers. In one or more embodiments of the invention, the symbol generator (114) includes functionality to generate a symbol. In one or more embodiments of the invention, a symbol is a collection of data that a symbol reader is able to read and interpret. A symbol may be a visual element, such as a QR code, two dimensional bar code, or glyph. Alternatively, a symbol may include non-visual elements, such as sounds, vibrations, or light patterns. In one or more embodiments of the invention, the symbol generator (114) generates symbols that are human-readable.

In one or more embodiments of the invention, symbols generated by the symbol generator (114) are encoded with purchase data and bidirectional connection data. Further information about purchase data is provided in FIG. 2. Further information about bidirectional connection data is provided in FIG. 3. Symbols may also be encoded with universal resource location addresses where purchase data and/or connection data may be obtained.

In one or more embodiments of the invention, the display (110) is a combination of hardware and software with functionality to present the symbol to the mobile device. In one or more embodiments of the invention, the display is a visual display on the POS system, such as a touchscreen, heads-up display (e.g., within glasses or other device worn by a person), or computer monitor.

In one or more embodiments of the invention, the symbol reader (104) is a combination of hardware and software with functionality to read and interpret a symbol generated by the symbol generator (114) and presented on the display (110). Specifically, the symbol reader (104) may include functionality to extract and decode information encoded in the symbol, such as purchase data and bidirectional connection data. The symbol reader may be implemented, in part, using a camera attached to the mobile device (100) and a symbol interpreter (e.g., a QR code reader application).

In one or more embodiments of the invention, each bidirectional connection endpoint (bidirectional connection endpoint A (106A), bidirectional connection endpoint B (106B)) is a combination of hardware and software with functionality to establish a bidirectional connection. Specifically, each bidirectional connection endpoint (bidirectional connection endpoint A (106A), bidirectional connection endpoint B (106B)) may include functionality to send a connection request to another bidirectional connection endpoint, service a connection request, and transmit data to another bidirectional connection endpoint. Examples of bidirectional connection endpoints include, but are not limited to, wireless networking antennas, near field communication radios, and Bluetooth radios (Bluetooth® is a registered trademark of Bluetooth SIG, Inc.).

In one or more embodiments of the invention, each bidirectional connection endpoint (bidirectional connection endpoint A (106A), bidirectional connection endpoint B (106B)) includes functionality to establish a connection with a connection point (116). In one or more embodiments of the invention, the connection point (116) is a combination of hardware and software with functionality to facilitate the bidirectional connection between the mobile device (100) and the POS system (102). In one or more embodiments of the invention, a connection point may be implanted as an access point for a wireless network.

In one or more embodiments of the invention, the payment application (108) is software with functionality to generate payment data using purchase data. The payment application (108) may include functionality to initiate transfers of funds between financial institutions. In one or more embodiments of the invention, the payment data includes a payment instrument (e.g., credit card information, debit card information, etc.) used to generate payment data. Further details about payment data is provided in FIG. 4.

In one or more embodiments of the invention, the mobile device (100), POS system (102), and connection point (116) may include elements not shown in FIG. 1, such as a computer processor, memory, and storage.

FIG. 2 shows a diagram of purchase data in accordance with one or more embodiments of the invention. As shown in FIG. 2, the purchase data (200) includes an invoice identifier (202) and an invoice (204).

In one or more embodiments of the invention, the purchase data (200) is a collection of information that describes a sale or business transaction. In one or more embodiments of the invention, the purchase data (200) is generated by a POS application. In one or more embodiments of the invention, the invoice identifier (202) is a unique key that identifies an invoice to the POS application.

In one or more embodiments of the invention, the invoice (204) is a record of a transaction. Specifically, the invoice (204) is an electronic commercial document issued by a seller or merchant to a buyer or customer. The invoice (204) may indicate the products, quantities, and agreed prices for products or services the seller has provided the buyer. The invoice (204) may also include instructions to the buyer or customer regarding accepted forms of payment and information necessary to make the payment (e.g., bank account number, bank name, etc.). The invoice (204) may also include the format in which the proof of payment is to be submitted. In one or more embodiments of the invention, the invoice (204) includes a token that identifies the details of the invoice to a service end point trusted by the merchant.

FIG. 3 shows a diagram of bidirectional connection data in accordance with one or more embodiments of the invention. As shown in FIG. 3, the bidirectional connection data (300) includes a connection type (302), connection credentials (304), and a connection target (306).

In one or more embodiments of the invention, the bidirectional connection data (300) is information generated by a POS system and used by a mobile device to establish a bidirectional connection. In one or more embodiments of the invention, the connection type (302) describes the protocol and/or medium for the bidirectional connection. For example, the connection type (302) for a bidirectional connection implemented over a wireless network may include 802.11ac as the protocol and "wireless network" as the medium. The connection type (302) may include multiple protocols and/or mediums. For example, a connection type (302) may instruct the mobile device to use secure hypertext transfer protocol over an 802.11ac wireless networking connection.

In one or more embodiments of the invention, the connection credentials (304) are information indicating that the holder of the connection credentials is authorized to establish a bidirectional connection. The connection credentials (302) may also be used by the POS system to identify the mobile device establishing the bidirectional connection. For example, connection credentials (302) for a wireless networking bidirectional connection may include the network name and password. The connection credentials (302) may further be used to compare with credentials submitted as part of a connection request from a mobile device to verify that the mobile device is authorized to establish the bidirectional connection.

In one or more embodiments of the invention, the connection target (306) describes an identifier of the POS system within the bidirectional connection. The connection target (306) may be a network address (e.g., internet protocol address, media access control address, etc.), a device name, or any other unique identifier for the POS system on the bidirectional connection.

In one or more embodiments of the invention, the bidirectional connection data (300) includes a subset of the connection type (302), connection credentials (304), and connection target (306), dependent upon the specific bidirectional connection.

FIG. 4 shows a diagram of payment data in accordance with one or more embodiments of the invention. As shown in FIG. 4, the payment data (400) includes an invoice identifier (402) and proof of payment (404).

In one or more embodiments of the invention, the payment data (400) is an indication that payment has been made according to the purchase data. In one or more embodiments of the invention, the invoice identifier (402) is a unique key that identifies an invoice to the POS application. In one or more embodiments of the invention, the invoice identifier (402) matches the invoice identifier stored in the purchase data obtained by the mobile device.

In one or more embodiments of the invention, the proof of payment (404) is data asserting that the purchase data has been satisfied via the requested payment process. In one or more embodiments of the invention, the proof of payment (404) is data indicating that funds have been transferred from the customer's account to the merchant's account. The proof of payment (404) may be electronically signed by the institution receiving the payment on the merchant's behalf.

Figure 5:
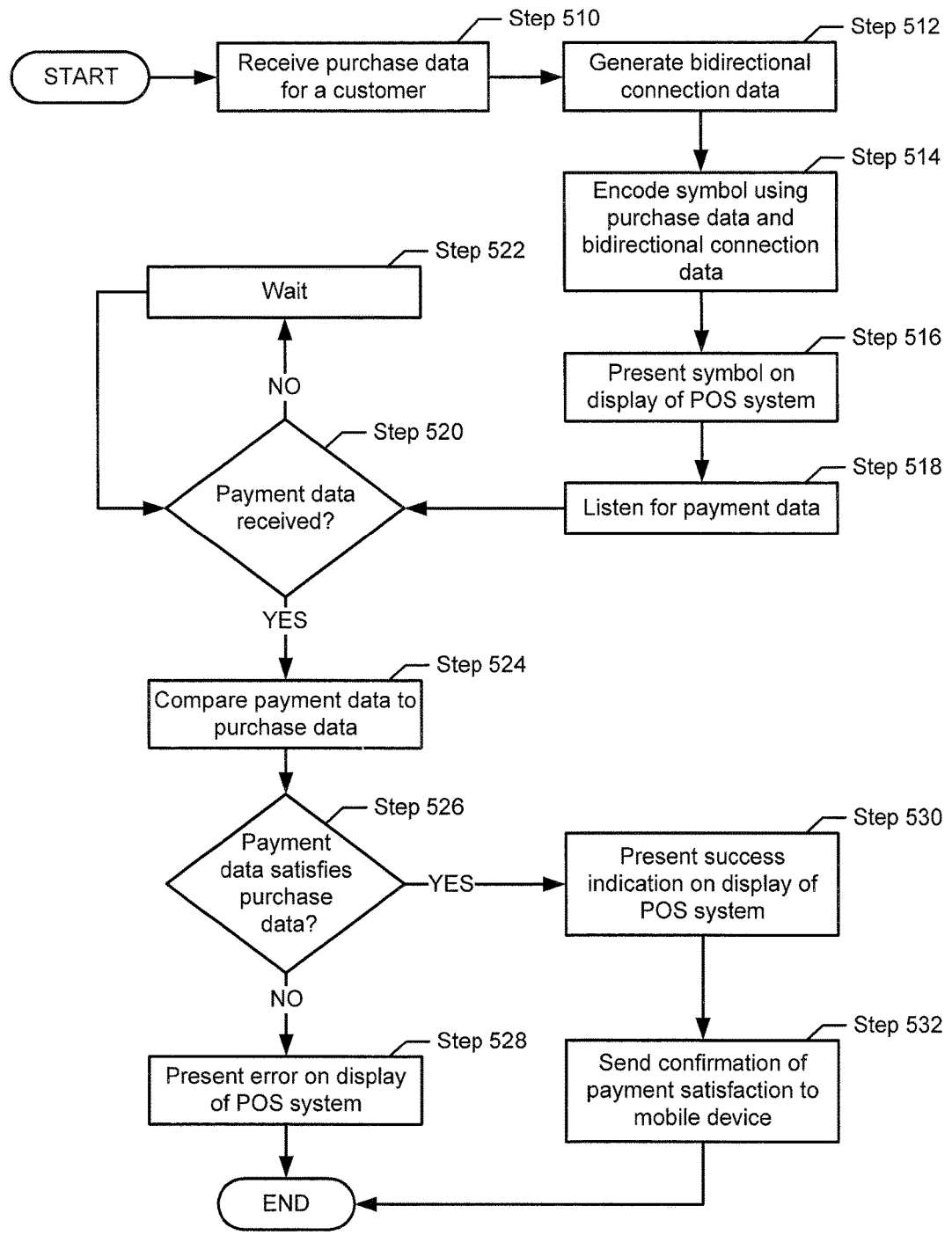
FIGS. 5 and 6 show flow diagrams in accordance with one or more embodiments of the invention.

FIG. 5 shows a flowchart for a POS system establishing a bidirectional connection and receiving payment data in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 510, the POS system receives purchase data for a customer. In one or more embodiments of the invention, the purchase data is generated by a POS system as part of a sales transaction. In Step 512, the POS system generates bidirectional connection data. In one or more embodiments of the invention, generating the bidirectional connection data includes obtaining information from the merchant operating the POS system. For example, the merchant may be asked to choose a connection type supported by the customer's mobile device.

In Step 514, the POS system encodes a symbol using the purchase data and the bidirectional connection data. In Step 516, the POS system presents the symbol on the display of the POS system (e.g., a POS screen, heads-up display (e.g., within glasses or other device worn by a person), or computer monitor). In one or more embodiments of the invention, once the symbol is presented on the display, the POS system enables a bidirectional connection endpoint on the POS system and instructs the bidirectional connection endpoint to accept connection requests made according to the bidirectional connection data encoded in the symbol.

In Step 518, the POS system listens for payment data. In one or more embodiments of the invention, listening for payment data includes servicing requests to establish a bidirectional connection. In one or more embodiments of the invention, establishing the bidirectional connection includes verifying that the credentials submitted to establish the bidirectional connection match the connection credentials encoded in the symbol. In Step 520, the POS system determines whether payment data has been received over the bidirectional connection. If in Step 520, the POS system determines that payment data has not been received (or that the mobile device has not established the bidirectional connection), then in Step 522, the POS system waits.

If in Step 520, the POS system determines that payment data has been received, then in Step 524, the POS system compares the payment data to the purchase data. In Step 526, the POS system determines whether the payment data satisfies the purchase data. In one or more embodiments of the invention, determining whether the payment data satisfies the purchase data includes verifying the proof of payment in the payment data. Verifying the proof of payment may include, for example, validating the electronic signature, requesting verification from the merchant's bank that the transfer was made, or verifying that the transfer to the merchant's digital wallet was completed.

If in Step 526, the PUS system determines that the payment data does not satisfy the purchase data, then in Step 528, the POS system presents an error on the PUS system display. In one or more embodiments of the invention, the error may include details regarding the point of failure of the received payment data. A merchant receiving an error may restart the process while avoiding the error.

If in Step 526, the POS system determines that the payment data satisfies the purchase data, then in Step 530, the POS system presents an indication of success on the POS system display. In Step 532, the POS system sends payment confirmation to the mobile device over the bidirectional connection. The payment confirmation may include a digital receipt and proof of acceptance of payment.

Figure 6:
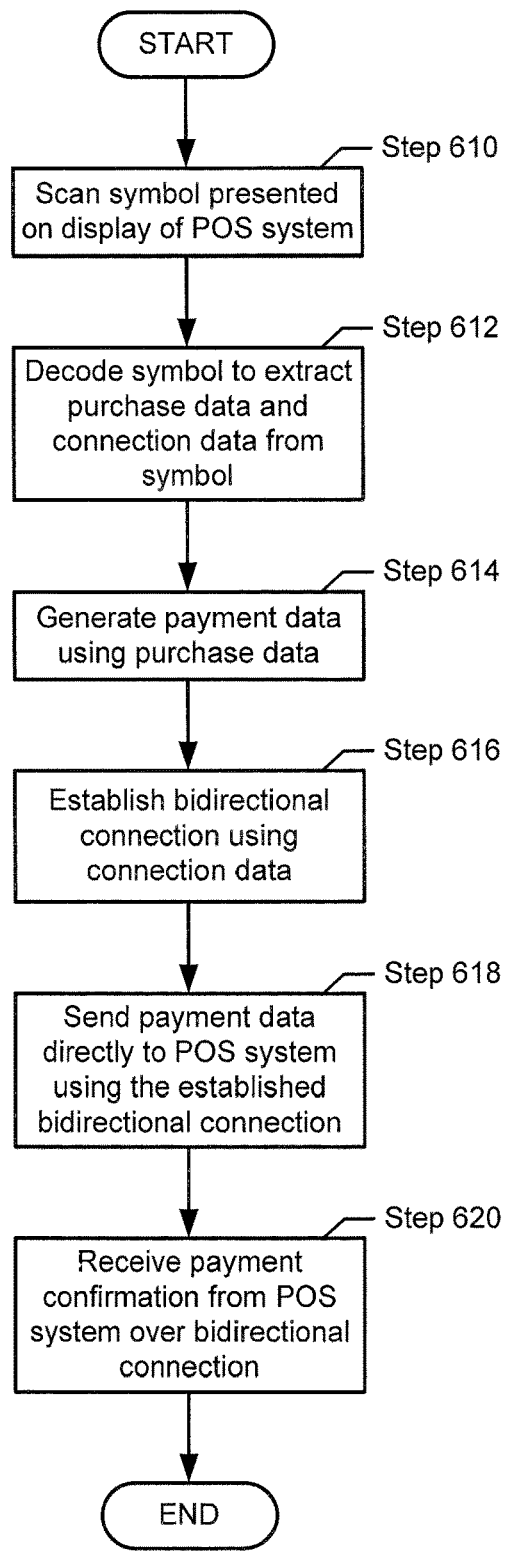

FIG. 6 shows a flowchart for a mobile device reading and decoding a symbol, establishing a bidirectional connection, and sending payment data in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 610, the mobile device scans the symbol presented on the display of the POS system. In one or more embodiments of the invention, the symbol is scanned by a camera attached to the mobile device. In one or more embodiments of the invention, the customer is presented with a viewfinder screen and instructed to move the mobile phone such that the symbol appears within the boundaries of the presented viewfinder. In Step 612, the mobile device decodes the symbol and extracts purchase data and connection data from the decoded symbol.

In Step 614, the mobile device generates payment data using the purchase data. Generating payment data may include using the proof of payment and the invoice identifier to generate the payment data. In one or more embodiments of the invention, generating the payment data includes transferring payment to the merchant according to the purchase data. Generating payment data may also include, for example, authorizing a bank transfer to the merchant's account, initiating a transfer of digital currency, and obtaining account details and authorization information enabling the POS system to charge the customer's account.

Step 614 may also include presenting details of the purchase data to the customer and obtaining an indication from the customer that payment is authorized. The indication from the customer may be received from a physical interaction between the mobile device and the customer, a gesture made by the customer and detected by the mobile device, a voice command from the customer, or any other readable input interpreted by the mobile device as a payment authorization.

In Step 616, the mobile device establishes a bidirectional connection using the connection data. Establishing the bidirectional connection may include accessing a network using connection credentials provided in the connection data and performing a handshaking process with the POS system. Establishing the bidirectional connection may also include contacting a connection point (e.g., a wireless access point) and negotiating access to a network. Once access to the network has been granted, the mobile device may then use the connection target to locate the POS system on the network and establish the bidirectional connection over the network.

In Step 618, the mobile device sends payment data directly (or indirectly via a connection point) to the POS system over the established bidirectional connection. Once the payment data is received by the POS system, the POS system may then determine whether the payment has been accepted. In Step 620, the mobile device receives payment confirmation from the POS system over the bidirectional connection.

Figure 7A:
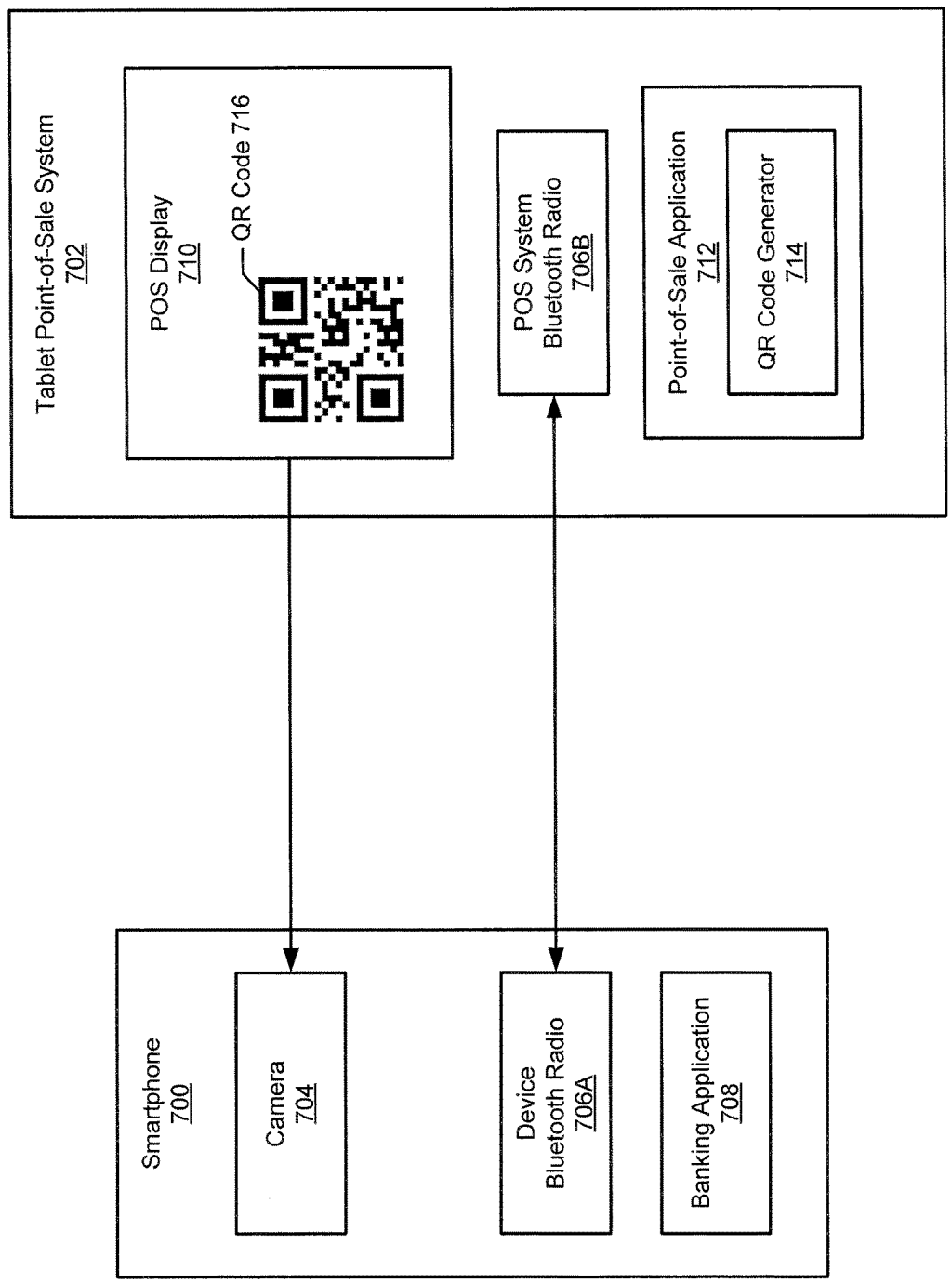
FIGS. 7A, 7B, 7C, 7D, 7E, 7F, 7G, and 7H show an example in accordance with one or more embodiments of the invention.

FIGS. 7A-7H show an example in accordance with one or more embodiments of the invention. Specifically, FIG. 7A shows an example system in accordance with one or more embodiments of the invention. As shown in FIG. 7A, the example system includes a mobile device implemented as a smartphone (700) and a POS system implemented as a tablet POS system (702). The smartphone (700) includes a symbol reader implemented as a camera (704), a bidirectional connection endpoint implemented as a device Bluetooth radio (706A), and a payment application implemented as a banking application (708). The tablet POS system (702) includes a POS display (710), a bidirectional connection endpoint implemented as a POS system Bluetooth radio (706B), and a POS application (712). The POS application (712) includes a symbol generator implemented as a QR code generator (714).

Figure 7B:
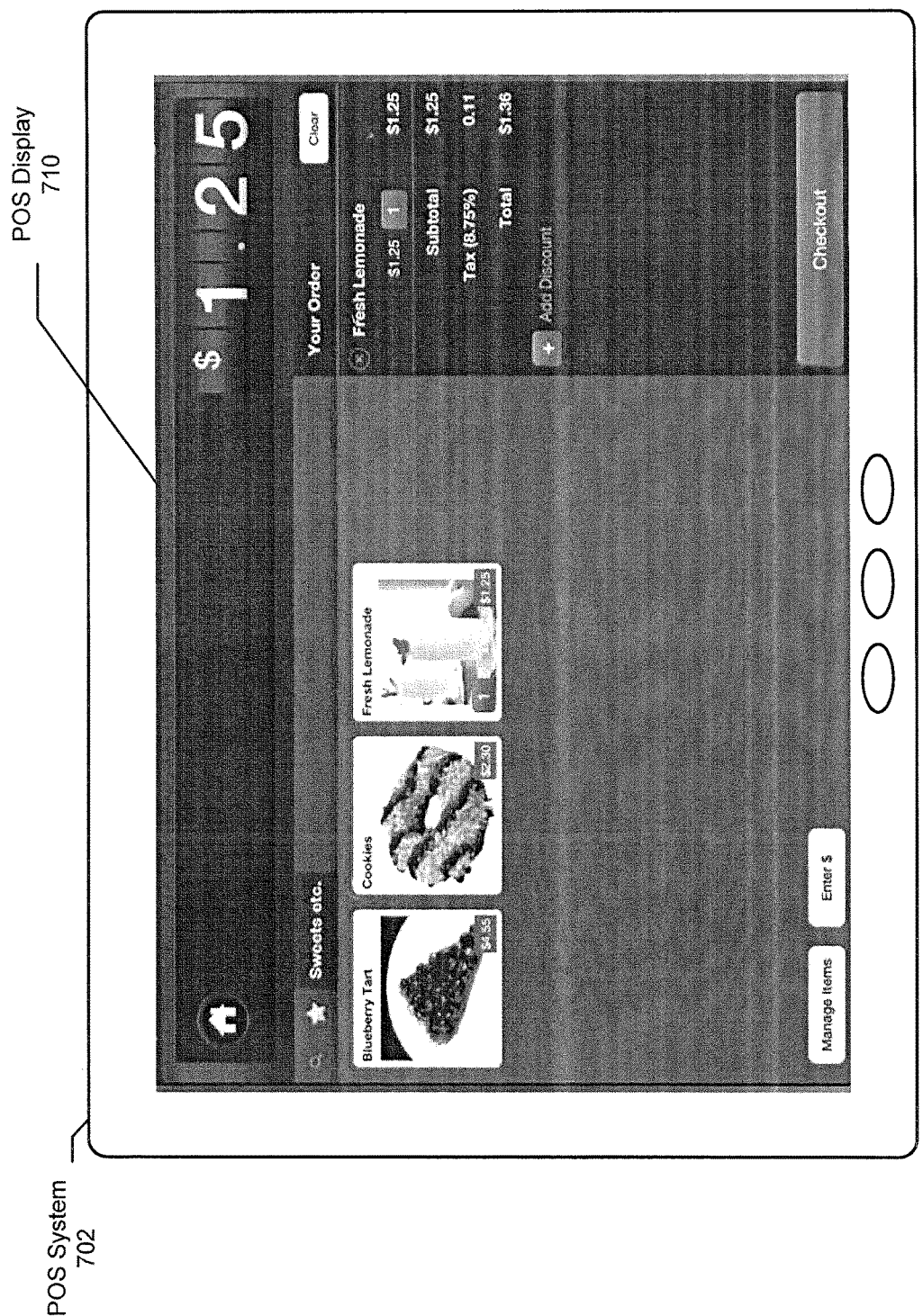

FIG. 7B shows an example tablet POS system user interface (UI) displaying the products that a customer intends to purchase and the total cost of the products. A merchant may be presented with this screen once the product codes for the blueberry tart, cookies, and fresh lemonade have been entered into the tablet POS system (702). The POS display (710) also provides an option to checkout (i.e., indicate that all items intended to be purchased in this transaction have been entered into the tablet POS system (702)).

Once the merchant selects the checkout option, the tablet POS system (702) generates the purchase data and the bidirectional connection data. The purchase data includes the information displayed in the "receipt" portion of the POS display (710). The merchant operating the tablet POS system (702) may be asked to select a protocol to use for the bidirectional connection. At this point, the merchant may ask the customer if the customer's smartphone (700) supports the Bluetooth protocol. Assuming the customer answers in the affirmative, the merchant will select Bluetooth as the protocol to use for the bidirectional connection. The tablet POS system (702) may then generate the bidirectional connection data with the connection type indicating the Bluetooth protocol, connection credentials that include a unique connection identification number, and the address of the POS system Bluetooth radio (706B). The purchase data and the bidirectional connection data is encoded into a QR code (716).

Figure 7C:
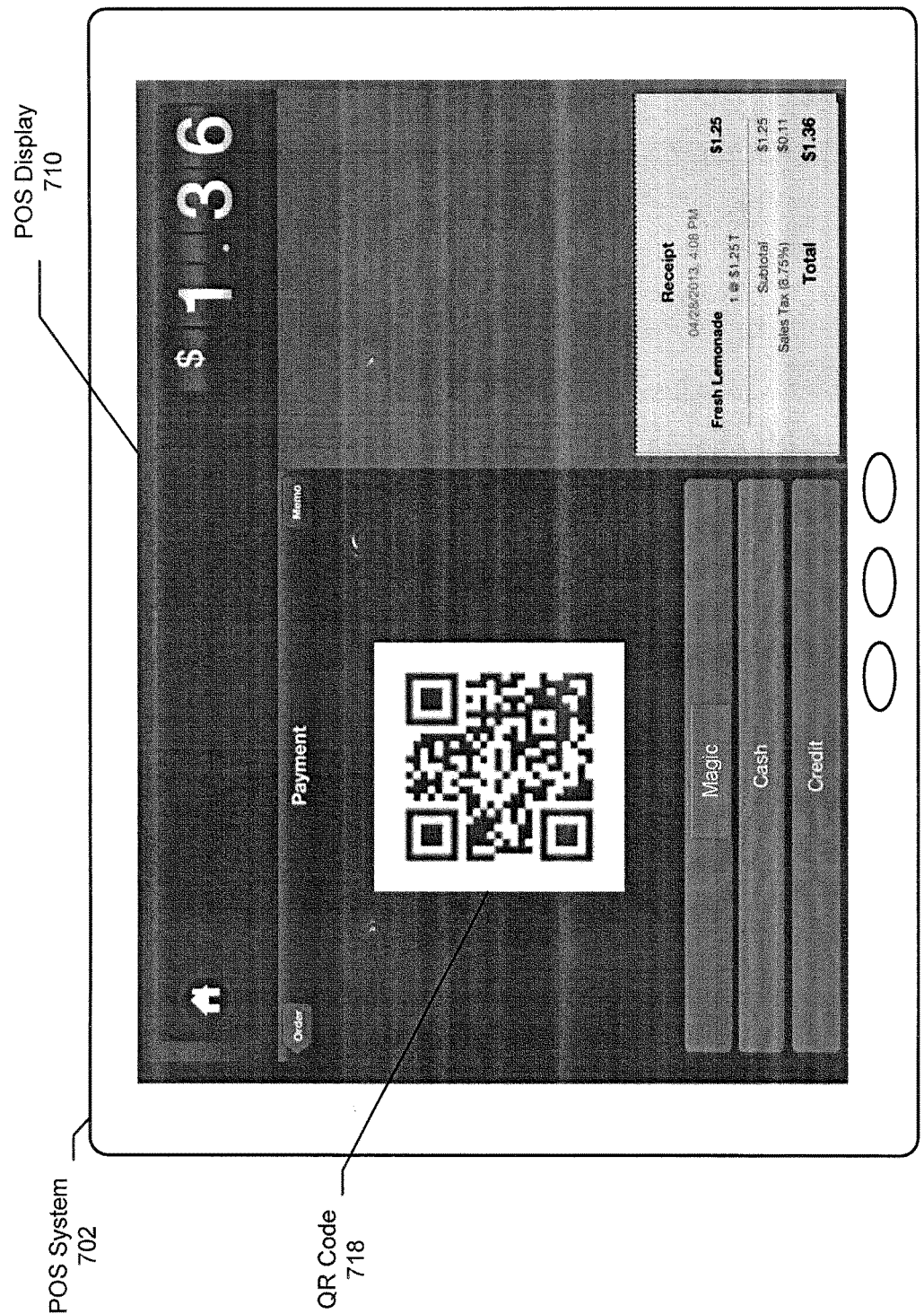

FIG. 7C shows an example tablet POS system UI presenting the QR code (716). Once the QR code (718) is presented on the POS display (710), the customer prepares her smartphone (700) to scan the QR code (718).

Figure 7D:
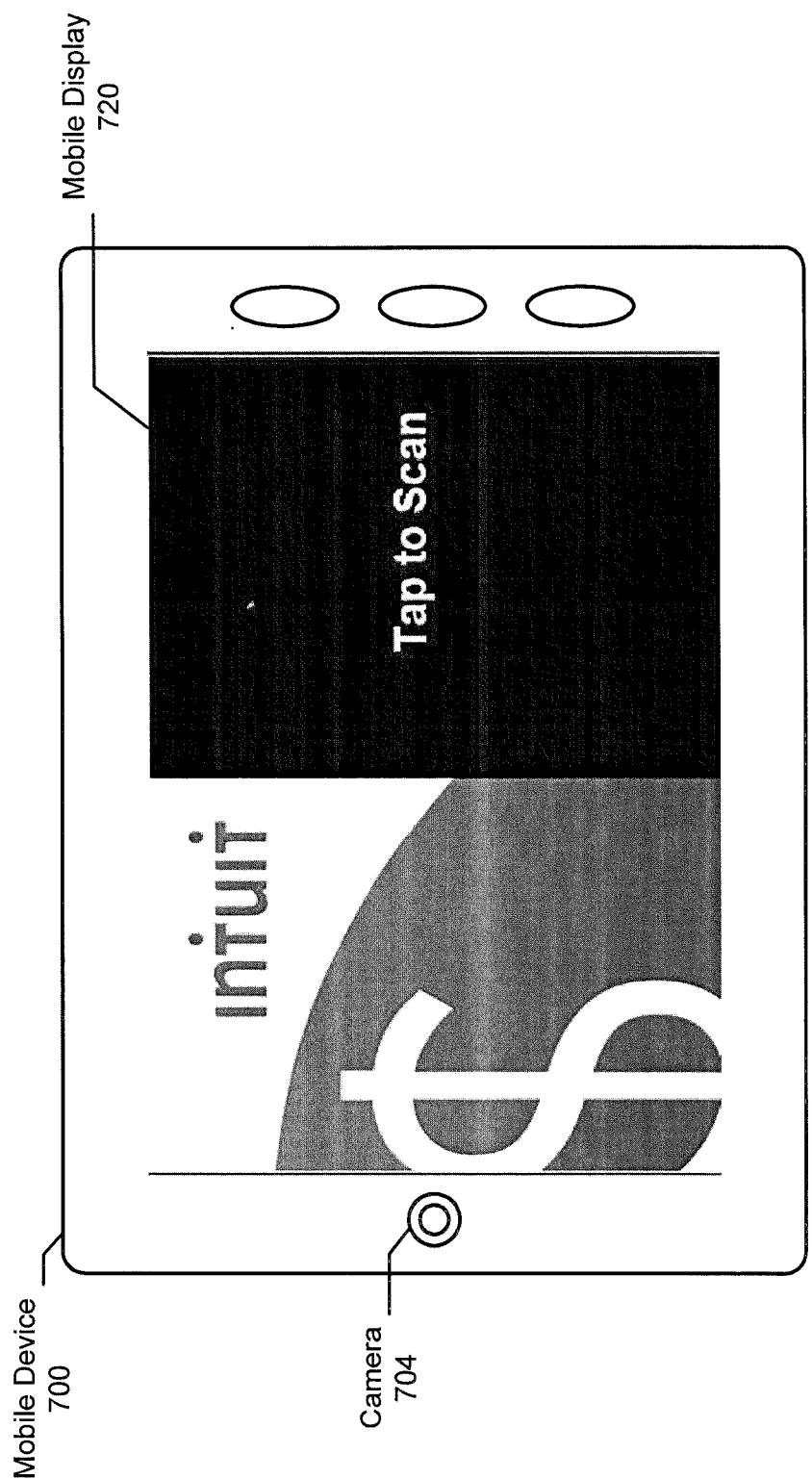

FIG. 7D shows an example smartphone UI displaying an option to enable the camera (704) to scan the QR code (716). Once the customer taps the mobile display (720), the camera (704) is activated and the customer is instructed to direct the camera (704) toward the QR code (716).

Figure 7E:
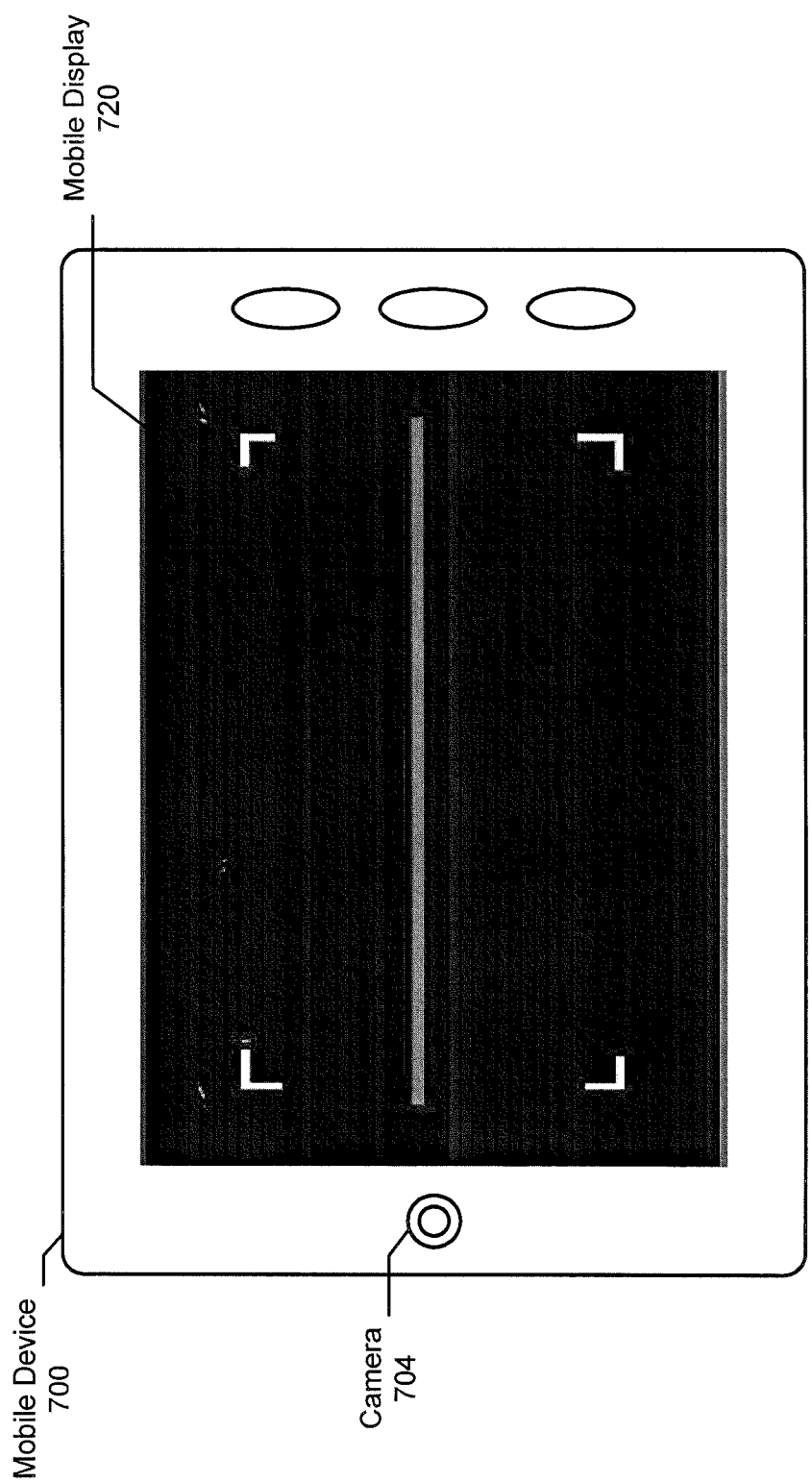

FIG. 7E shows an example smartphone UI displaying the viewfinder of the camera (704) to aid the customer in correctly positioning the camera (704) such that the QR code (716) may be read. Once the camera scans the QR code (716), the smartphone (700) decodes the QR code (716) to obtain the purchase data and the bidirectional connection data.

Figure 7F:
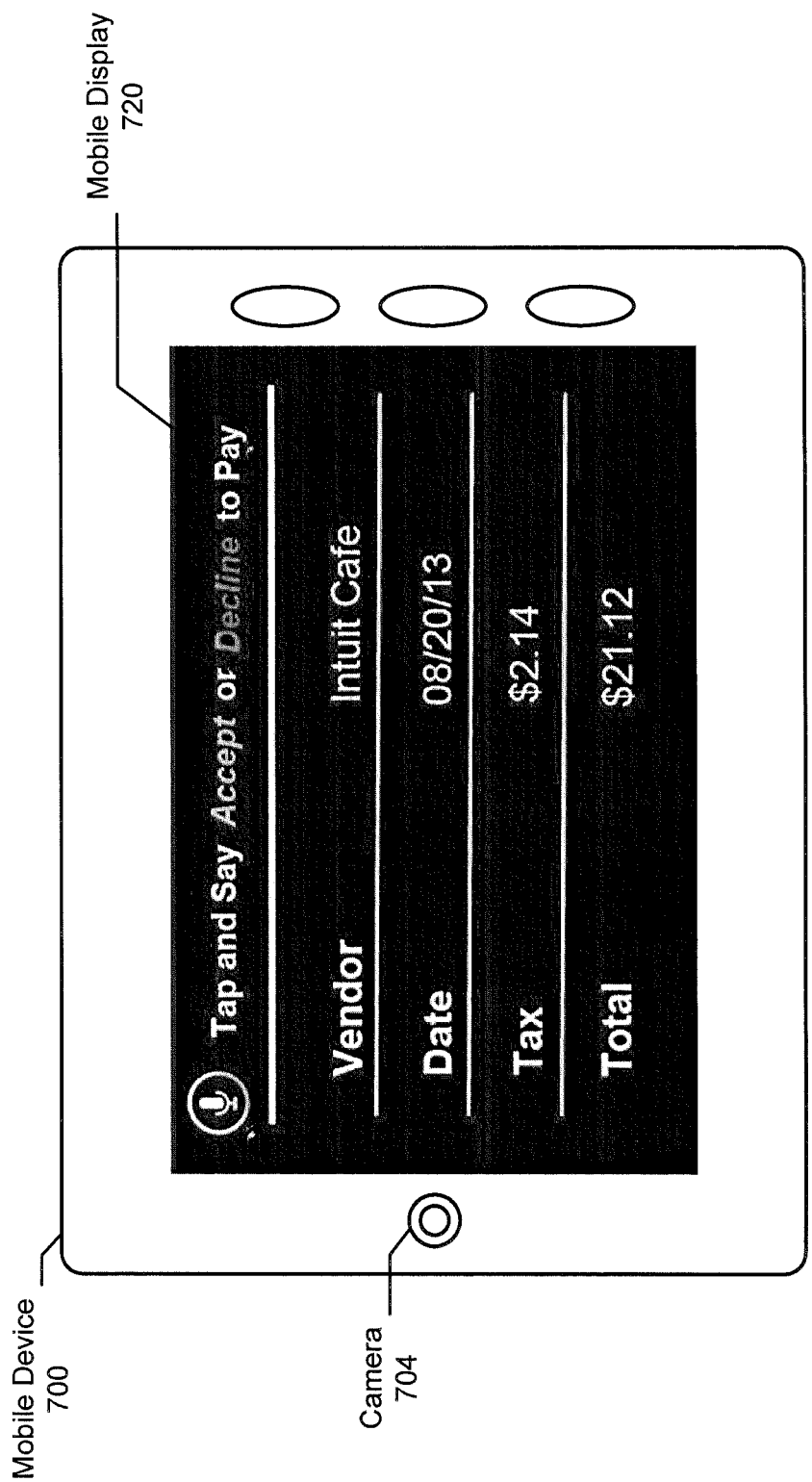

FIG. 7F shows an example smartphone UI displaying a portion of the purchase data to the customer, and requesting authorization to proceed with transferring funds to the merchants account. Once the smartphone (700) receives authorization from the customer, the banking application (708) proceeds to communicate with the customer's financial institution to transfer $21.12 to the merchant's account. Once the transfer has completed, the smartphone (700) receives proof of payment from the financial institution. The smartphone (700) then generates payment data using the proof of payment.

After the payment data is generated, the smartphone (700) attempts to establish the bidirectional connection using the bidirectional connection data decoded from the QR code (716). Using the device Bluetooth radio (706A), the smartphone makes a connection request to the POS system Bluetooth radio (706B) identified in the connection target of the bidirectional connection data.

Figure 7G:
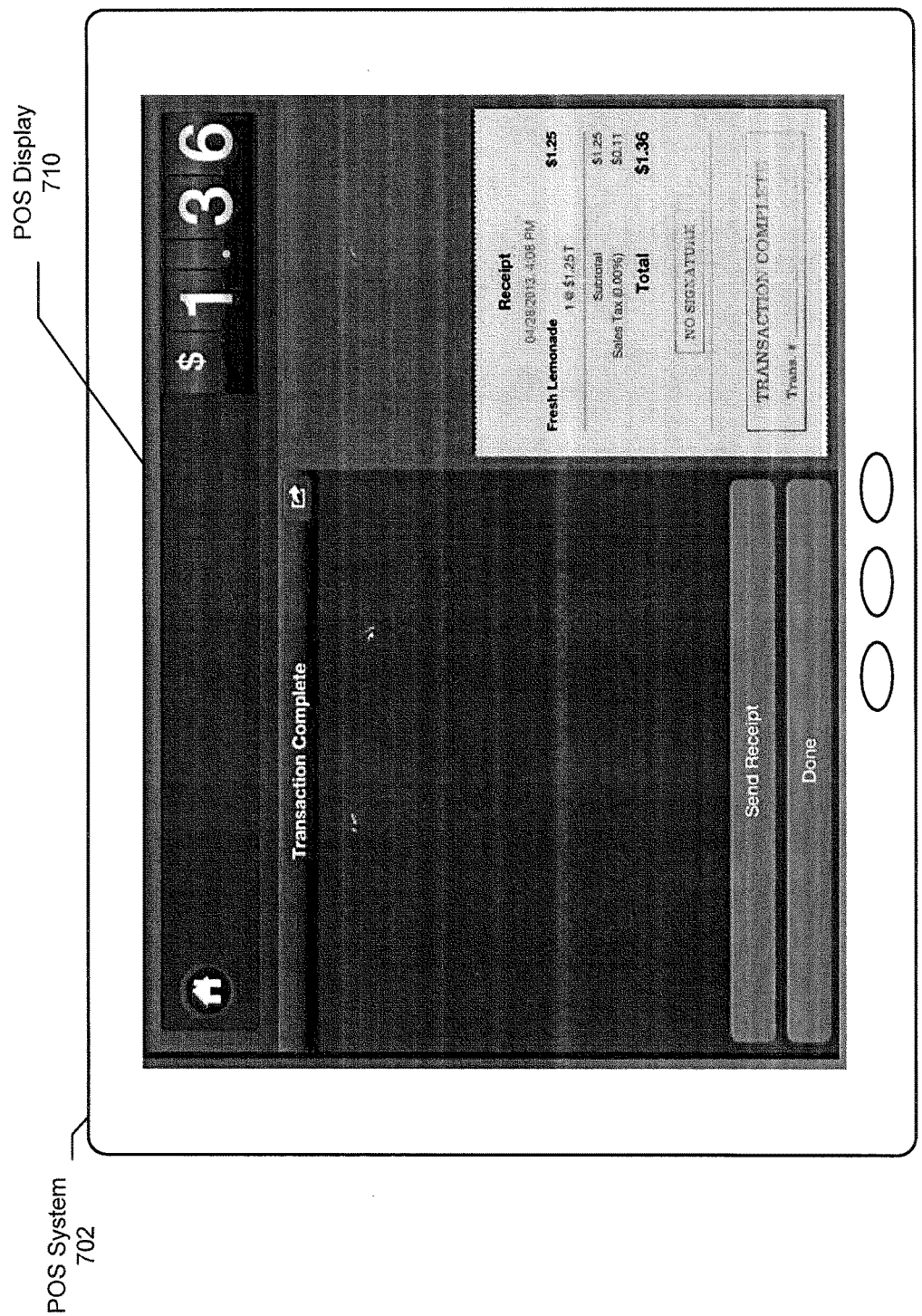

Once the Bluetooth connection is established, the smartphone (700) sends the payment data to the tablet POS system (702) directly over the Bluetooth connection. FIG. 7G shows an example tablet POS system UI after the payment data has been received and verified. The merchant is notified that the payment data satisfied the purchase data, and that the transaction is complete. The merchant is provided an option to transmit a receipt to the smartphone (700).

Figure 7H:
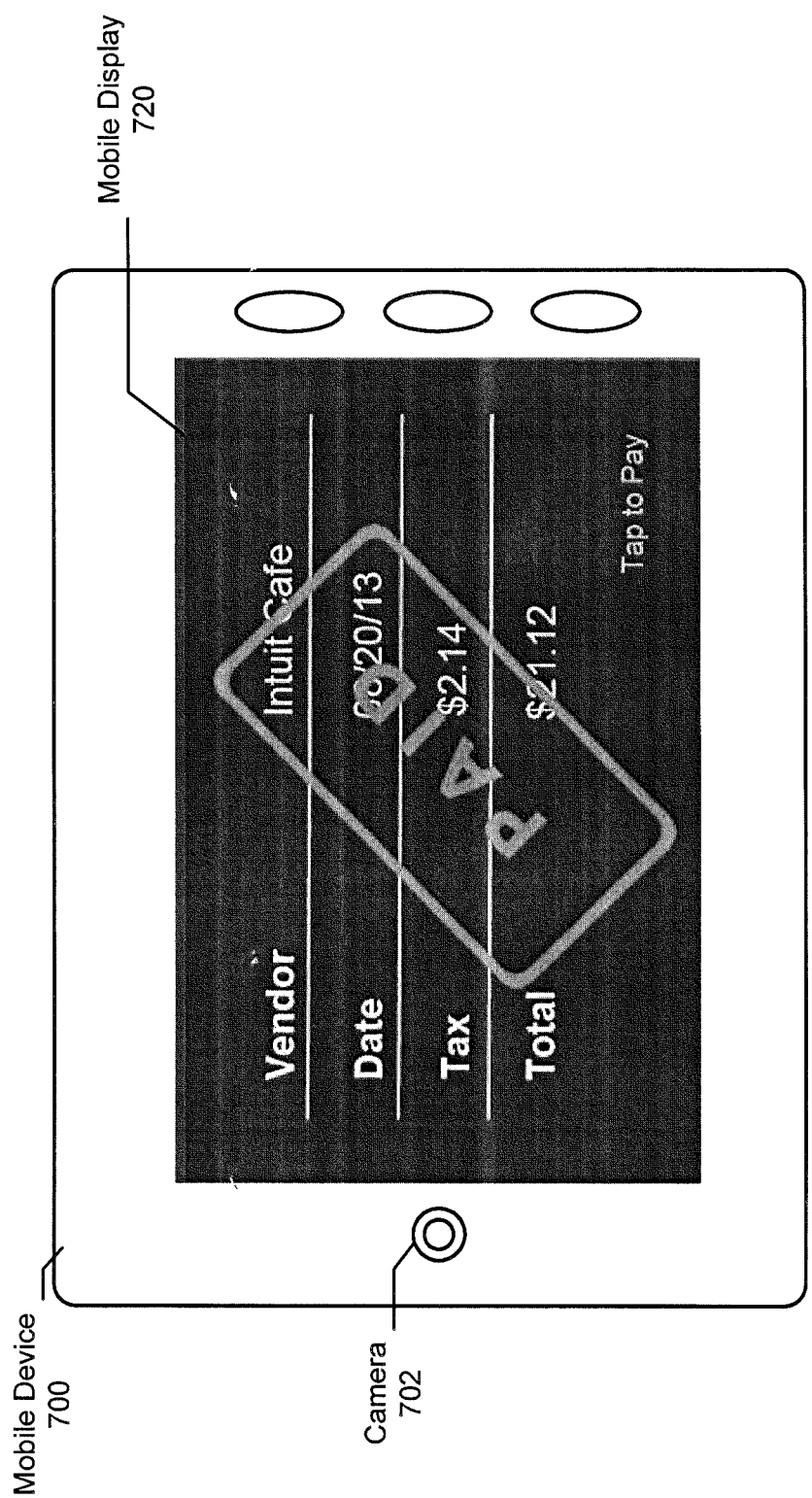

FIG. 7H shows an example smartphone UI after the smartphone (702) receives the payment confirmation for the transaction. The customer is notified that the payment was accepted. The transaction is complete and the bidirectional connection is severed.

Figure 8:
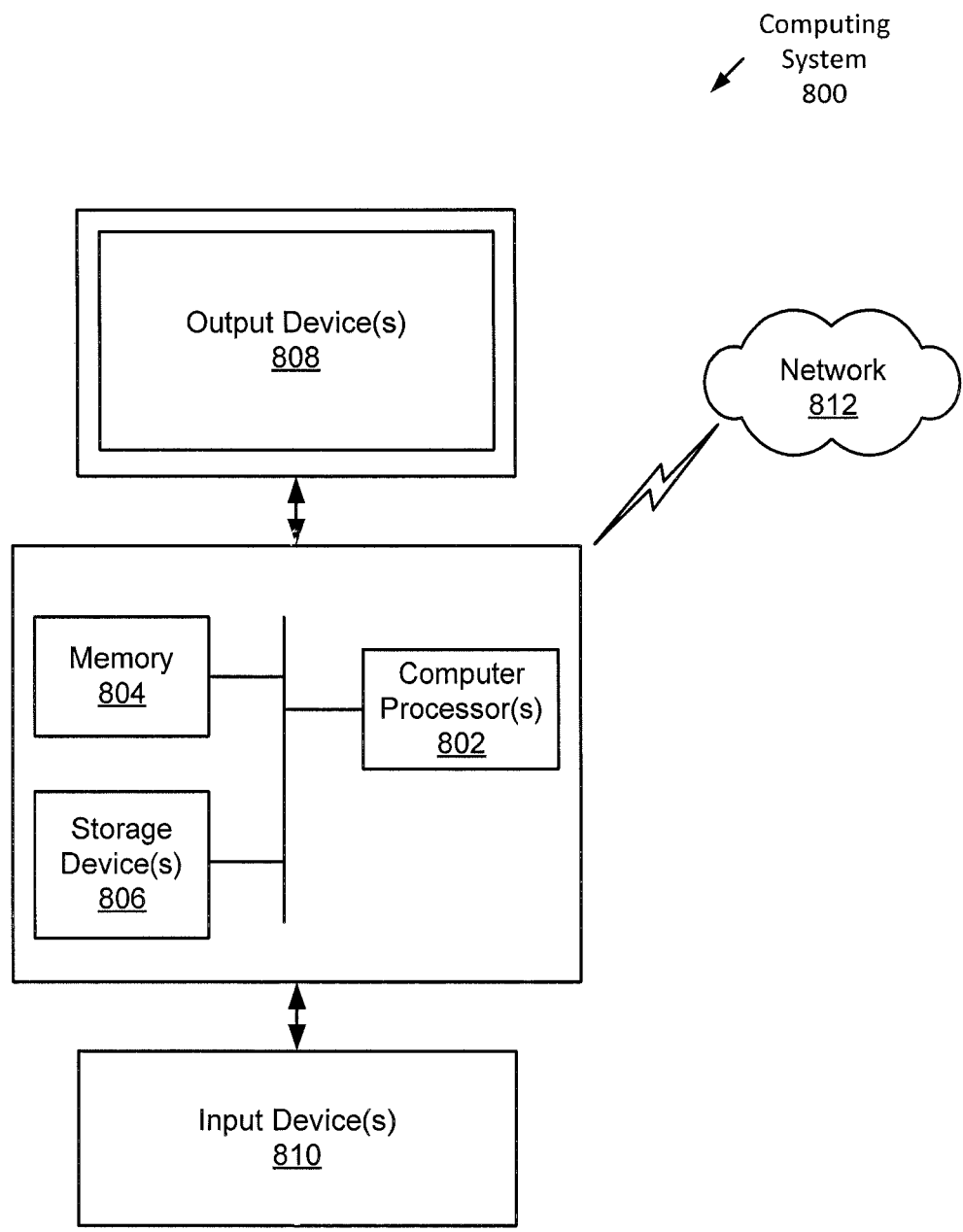
FIG. 8 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, heads-up display (e.g., within glasses or other device worn by a person), or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (800) may be located at a remote location and connected to the other elements over a network (812). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions that, when executed by a processor, perform a method, the method comprising:
   receiving, by a point of sale (POS) system, purchase data for a customer;
   generating bidirectional connection data for the customer, wherein the bidirectional connection data comprises a connection type identifying a network used to establish a bidirectional connection, a connection credential for authenticating access to the network, and a connection target for locating the POS system on the network;
   prompting the POS system to choose the bidirectional connection data supported by a mobile device of the customer;
   encoding, by the POS system, a combination of the purchase data and the bidirectional connection data into a symbol;
   presenting, on the POS system, the symbol to the customer for scanning by the mobile device;
   enabling the bidirectional connection in response to a connection request from the customer, wherein enabling the bidirectional connection comprises enabling the mobile device of the customer to:
      access, based on the connection type, the network using the connection credential;
      locate, subsequent to accessing the network and based on the connection target, the POS system on the network; and
      establish, in response to locating the POS system on the network, the bidirectional connection with the POS system over the network;
   receiving payment data from the customer over the bidirectional connection; and
   sending a payment confirmation to the customer over the bidirectional connection in response to a determination that the payment data satisfies the purchase data.

2. The non-transitory computer readable medium of claim 1, wherein enabling the bidirectional connection comprises determining that the connection request is based on the connection credential encoded in the symbol.

3. The non-transitory computer readable medium of claim 1, wherein the bidirectional connection connects the POS system to the mobile device of the customer via a connection point device of the network, wherein the connection point device is separate from the mobile device and the POS system.

4. The non-transitory computer readable medium of claim 1, wherein connection target comprises a network location of the POS system.

5. The non-transitory computer readable medium of claim 1, wherein the purchase data comprises instructions for transferring funds from a customer account to a merchant account.

6. The non-transitory computer readable medium of claim 1, wherein the payment data comprises a proof of payment indicating a transfer of funds from a customer account to a merchant account.

7. A method comprising:
prompting a point of sale (POS) system to choose bidirectional connection data supported by a mobile device;
encoding, by the POS system, a combination of purchase data and the bidirectional connection data into a symbol, wherein the symbol is presented on the POS system;
scanning, by the mobile device, the symbol presented on the POS system comprising a POS processor;
decoding, by the mobile device, the symbol to obtain the purchase data and the bidirectional connection data, wherein the bidirectional connection data comprises a connection type identifying a network used to establish a bidirectional connection, a connection credential for authenticating access to the network, and a connection target for locating the POS system on the network;
generating payment data using the purchase data;
accessing, by the mobile device and based on the connection type, the network using the connection credential;
locating, subsequent to accessing the network and based on the connection target, the POS system on the network;
establishing, by the mobile device and in response to locating the POS system on the network, the bidirectional connection with the POS system over the network;
sending the payment data to the POS system over the bidirectional connection; and
receiving payment confirmation from the POS system over the bidirectional connection in response to sending the payment data.

8. The method of claim 7, wherein the bidirectional connection connects the POS system to the mobile device of a customer via a connection point device of the network, wherein the connection point device is separate from the mobile device and the POS system.

9. The method of claim 7, wherein scanning the symbol comprises using a camera attached to the mobile device to generate an image of the symbol.

10. The method of claim 7, wherein generating the payment data comprises receiving authorization from a customer to transfer funds from a customer account to a merchant account.

11. The method of claim 7, wherein the connection target comprises a network location of the POS system.

12. The method of claim 7, wherein establishing the bidirectional connection comprises submitting the connection credential to the POS system.

13. A system comprising:
a point of sale (POS) system comprising:
a POS processor;
a display; and
a POS application, executing on the POS processor, configured to receive purchase data for a customer; generate bidirectional connection data for the customer, wherein the bidirectional connection data comprises a connection type identifying a network used to establish a bidirectional connection, a connection credential for authenticating access to the network, and a connection target for locating the POS system on the network;
prompt the POS system to choose the bidirectional connection data supported by a mobile device of the customer;
encode a combination of the purchase data and the bidirectional connection data into a symbol;
present, on the display, the symbol to the customer for scanning by the mobile device;
enable the bidirectional connection in response to a connection request from the customer, wherein enabling the bidirectional connection comprises enabling the mobile device of the customer to:
access, based on the connection type, the network using the connection credential;
locate, subsequent to accessing the network and based on the connection target, the POS system on the network; and
establish, in response to locating the POS system on the network, the bidirectional connection with the POS system over the network;
receive payment data from the customer over the bidirectional connection; and
send a payment confirmation to the customer over the bidirectional connection in response to a determination that the payment data satisfies the purchase data.

14. The system of claim 13, wherein the mobile device comprises:
a mobile device processor;
a symbol reader configured to read the symbol; and
a payment application, executing on the mobile device processor, configured to:
receive the symbol from the symbol reader;
decode the symbol to obtain the purchase data and the bidirectional connection data;
generate the payment data using the purchase data;
establish the bidirectional connection with the POS system;
send the payment data to the POS system over the bidirectional connection; and
receive the payment confirmation from the POS system over the bidirectional connection in response to sending the payment data.

15. The system of claim 14, further comprising:
a connection point device configured to:
receive, from the mobile device, a request to establish the bidirectional connection with the POS system; and
send the request to the POS system.

16. The system of claim 15,
wherein establishing the bidirectional connection comprises submitting the connection credential to the connection point device.

17. The system of claim 15, wherein the bidirectional connection connects the POS system to the mobile device via the connection point device.

18. The system of claim 14, wherein the connection target comprises a network location of the POS system.

19. The system of claim 14, wherein the symbol reader is a camera, and wherein receiving the symbol from the symbol reader comprises generating, by the camera, an image of the symbol.

20. The system of claim 14, wherein the purchase data comprises instructions for transferring funds from a customer account to a merchant account.

* * * * *